(12) United States Patent
Teckchandani et al.

(10) Patent No.: US 6,816,090 B2
(45) Date of Patent: Nov. 9, 2004

(54) MOBILE ASSET SECURITY AND MONITORING SYSTEM

(75) Inventors: Ashok Teckchandani, Fremont, CA (US); Sanjay Chetwani, Fremont, CA (US); Kailas Dornadula, Fremont, CA (US); Paul Andre, Mountain View, CA (US); Shyam Dujari, Saratoga, CA (US)

(73) Assignee: Ayantra, Inc., Fremont, CA (US)

( * ) Notice: Subject to any disclaimer, the term of this patent is extended or adjusted under 35 U.S.C. 154(b) by 0 days.

(21) Appl. No.: 10/306,447

(22) Filed: Nov. 27, 2002

(65) Prior Publication Data

US 2003/0151501 A1 Aug. 14, 2003

Related U.S. Application Data

(63) Continuation-in-part of application No. 10/073,725, filed on Feb. 11, 2002.

(51) Int. Cl.[7] ................................................ G08G 1/123
(52) U.S. Cl. .................. 340/989; 340/990; 340/539.13
(58) Field of Search ................ 340/426.13, 426.15, 340/426.16, 426.17, 426.18, 426.19, 426.2, 426.21, 426.22, 438, 988, 539.11, 539.13, 539.2, 989, 990, 991, 995.23, 995.27; 701/1, 117, 213, 301; 455/414.2, 456.5, 457

(56) References Cited

U.S. PATENT DOCUMENTS

| | | | |
|---|---|---|---|
| 5,557,254 A | | 9/1996 | Johnson et al. |
| 6,028,537 A | * | 2/2000 | Suman et al. .......... 340/426.14 |
| 6,320,535 B1 | | 11/2001 | Hillman et al. |
| 6,362,730 B2 | * | 3/2002 | Razavi et al. ............... 340/438 |
| 6,442,485 B2 | * | 8/2002 | Evans ......................... 701/301 |
| 2002/0004720 A1 | | 1/2002 | Janoska |

* cited by examiner

*Primary Examiner*—Van T. Trieu

(57) ABSTRACT

The present invention is a mobile asset security system that enables remote tracking and monitoring of the asset. The security system is equipped with a control and intelligence unit, a position determining device and a number of intrusion detection devices. The control and intelligence unit processes information from the position determining device with the help of an in-built virtual mapping system to obtain geographic information of the vehicle in the form of name of place, street, coordinates, etc. The control unit may be remotely configured and controlled through a built in voice recognition and DTMF tone detector. The geographic information and information regarding any violation of intrusion detection devices is converted to synthesized speech using a text to speech system. The text to speech system converts the speech to a language desired by the user. The synthesized speech is transmitted to the user's communication device over an existing communication network.

11 Claims, 5 Drawing Sheets

MOBILE ASSET SECURITY AND MONITORING SYSTEM

REFERENCE TO RELATED APPLICATIONS

This application is a continuation in part of U.S. patent application Ser. No. 10/073,725 filed Feb. 11, 2002.

BACKGROUND

1. Field of Invention

The present invention relates to an asset security and monitoring system. More specifically, the invention enables two-way communication between a user and a mobile asset for real time tracking and monitoring of the mobile asset.

2. Description of Related Art

Theft of mobile assets (such as vehicles) is an issue that has always troubled asset owners and law enforcing authorities. Sophisticated security mechanisms are being developed to prevent thefts, but thefts and related crimes continue to be prevalent. This is because professional thieves can easily break into conventional security systems. Carjacking, which is theft of a vehicle at gunpoint, is also quite prevalent and law-enforcing authorities face great difficulties in tracking such stolen vehicles. Thus, improved asset security systems need to be developed to prevent theft of mobile assets such as vehicles and related crimes.

A typical vehicle security system comprises sensors attached to different parts of the vehicle. These sensors detect any intrusion in the vehicle and are also referred to as intrusion detection devices. The intrusion detection devices are connected to an alarm system. The security system is operated through a remote control. The alarm system can be armed and unarmed by using this remote control. In case of an activated alarm system, triggering of the alarm indicates any security breach. The alarm may be in the form of sounding of the vehicle's horn, or flashing of vehicle lights, or transmitting a "distress" signal to the remote control. The owner can immobilize the ignition or the starting mechanism of the vehicle using the remote control on being alerted of a security breach.

These types of security systems have several disadvantages. Vehicle alarms have become so common that they hardly attract attention of the owner or passers-by. Similarity of the vehicle's horn also makes it difficult to distinguish one alarm system and any other such alarm that may occur in the vicinity. Further, the remote control transmitters usually have a limited power output of about 1 milliwatt (1 mW); this limits the operational range of the transmitter to a few hundred feet. The vehicle owner has to be physically present within this range to arm or disarm the vehicle security system. In addition to the above shortcomings, a conventional vehicle security system only signals a security breach. It does not provide the means to track the vehicle and notify the vehicle owner about its location in case the vehicle is stolen.

More recently, devices have been developed that help in tracking a stolen vehicle. A company providing such a 'stolen vehicle recovery system' is LoJack of Massachusetts, USA. The LoJack system consists of a transmitter unit installed in a vehicle. In case this vehicle is stolen, the police can remotely activate the LoJack transmitter unit hidden in the vehicle. Once activated, this transmitter unit transmits a silent signal to tracking equipment fitted in police vehicles (such as vans and helicopters) and police stations, thereby, enabling the stolen vehicle to be tracked and recovered.

The LoJack system has several shortcomings. For a successful recovery of the vehicle, the owner has to detect the theft of the vehicle and report it to the police at the earliest. Moreover, the police in that area must have the requisite equipment to remotely activate the transmitter in the vehicle. Further, as the activating equipment has a limited range of effectiveness, the vehicle has to be in the equipment's range in order to be activated. Finally, the LoJack system is incapable of determining the precise location of the vehicle. Clearly, these shortcomings lessen the probability of a successful recovery of the stolen vehicle.

One way of locating the vehicle more precisely is by the use of Global Positioning System (GPS). The Global Positioning System (GPS) was designed for, and is operated by, the U.S. Department of Defense. The Global Positioning System consists of 24 earth-orbiting satellites that broadcast radio signals to enable a GPS receiver to compute its location. The satellites transmit position and time signals to a GPS receiver installed in the vehicle. The time signals are derived from accurate atomic clocks that are part of each satellite. The GPS receiver then processes this information to calculate its distance from a particular satellite by knowing the location of the satellite and calculating the time elapsed between the transmitted and received signal. This distance, when computed from a multitude of satellites simultaneously, determines precisely the location and velocity of the vehicle. The location determined by the GPS receiver is in terms of the latitude and longitude of the place. The latitude and longitude obtained from the GPS receiver when coupled with a map of the area can give the location of the vehicle in terms of the name of the city, town, street, etc. This information may further be presented by showing the vehicle on an appropriate street-map or a highway-map of the adjoining areas.

GPS technology can be used for tracking of vehicles for security purposes. Furthermore, a GPS receiver when coupled with a wireless communication device offers the potential of being used for remote tracking of the vehicle. Remote tracking of a vehicle is helpful in the recovery of a stolen vehicle. Such systems incorporating a GPS receiver coupled with a communication device are called Automatic Vehicle Location (AVL) systems. A typical AVL system consists of one or more security units installed within a vehicle; one or more vehicle monitoring stations; and a wireless communication network. The security unit typically consists of a GPS receiver coupled with a wireless transmitter (in addition to the features available in conventional security systems described earlier). The location data that is obtained from the GPS receiver is combined with additional information obtained from the security system to form one combined signal. The additional information may comprise of vehicle speed, engine characteristics, other trouble shooting data gathered using various intrusion detection devices and other equipment (such as the communication bus) in the vehicle. The combined signal is transmitted over a wireless communication medium, such as a cellular telephone network, to a vehicle monitoring station. The monitoring station receives the signal through a communication device and the combined signal is processed to retrieve GPS data and additional information obtained from the security system.

At the central monitoring station, the GPS data comprising of latitude and longitude obtained from the GPS receiver is coupled with mapping software to obtain the location of the vehicle in terms of name of the city, town, street etc. This information may also be presented by showing the vehicle on an appropriate street-map or a highway-map of the adjoining areas. As the GPS data is sent periodically to the monitoring station, the movement of the vehicle can be tracked on a map. The additional information obtained from the security system is also processed to determine the status of the intrusion detection devices and the "health" (or other essential parameters) of the vehicle. The information comprising the vehicle location on a map and additional data comprising information gathered from the security system is communicated to the owner; this communication to the owner is done by an operator in case of operator-assisted monitoring centers.

The monitoring center can also be automated. An automated monitoring center may comprise a web application or an automated telephone system. In case of an automated monitoring center, the owner can access the web application and retrieve the desired information pertaining to his/her vehicle through the World Wide Web. Further, the web application can also send this information to the user through email. Alternatively the owner may get this information through an automated telephone system.

Onstar developed by General Motors of USA, and TeleAid developed by Daimler Corporation (Mercedes Benz) of Germany, are systems that provide stolen vehicle tracking using built-in GPS technology and other customer services through operator-assisted vehicle monitoring stations. These systems offer subscription-based services that include emergency services, accident assistance, remote door lock and unlock, ride assistance, remote monitoring of vehicle, and other security features. The monitoring station receives signals regarding location of the vehicle and other signals from the security system in the vehicle through a communication device installed in the vehicle. An operator at the monitoring station thereafter conveys information regarding the "status" or the position of the vehicle as per the service requested by the owner. Since these monitoring stations are managed round the clock by operators, the subscription to such systems is often expensive.

U.S. Pat. Nos. 5,557,254 and 5,682,133, both assigned to Mobile Security Communications, Inc. of Norcross, Ga., USA, and both titled "Programmable Vehicle Monitoring And Security System Having Multiple Access Verification Devices" describe vehicle security systems that allow tracking of a stolen vehicle. These security systems comprise a GPS receiver coupled with a wireless communication device in addition to intrusion detection devices etc. The wireless communication device communicates information to a central monitoring station. The central monitoring station in this case may include many operations that are fully automated. For example, when the security system in the vehicle detects an intrusion, the central monitoring station may automatically call the owner. Further, an automated message comprising the location of the vehicle can be transmitted to the owner through the use of a voice unit. The voice unit creates voice output from digitally stored text. The security system also provides the owner with the functionality to remotely control and monitor various operational functions and mechanisms of the vehicle through the central monitoring station.

U.S. Pat. No. 6,320,535 assigned to Navox Corporation of Sherbrooke, Calif., USA, and titled "Vehicle Tracking And Security System Incorporating Simultaneous Voice And Data Communication" describes a system for simultaneous and continuous transmission of voice signals along with the location and vehicle security data to a monitoring station. This patent describes a method in which the voice of the owner in the vehicle is transmitted to the central monitoring station. This transmission of voice is in addition to the transmission of GPS and security data retrieved from the vehicle security system. For an effective transmission of GPS and location data along with voice signals, the system filters out a narrow band of the voice signal, centred at around 2500 HZ. The frequency 2500 Hz around which a narrow band is filtered is chosen so as to minimize degradation of the voice signal. A Digital Signal Processor (DSP) then inserts the GPS data and security data from the vehicle to fit within this narrow band created in the voice signal. The combined signal (comprising of voice and security data) is then sent through a cellular communication network to the monitoring station. The data received by the monitoring station is now filtered by a DSP to separate the GPS and security data from the voice portion of the signal. The voice portion of the signal is routed to a communication device so that an operator at the monitoring station may converse with the vehicle's occupant. A computer in conjunction with mapping software may also process the security data. The computer then displays a graphical representation of a map and the vehicle's location on such a map.

A vehicle security system using an external monitoring station is GPS2000 that is manufactured by IDC Inc. sold through Omega Research and Development Inc. and others. This system is capable of notifying the owner in case of any security breach. It is also used for remote tracking and control of the vehicle. The owner interacts with his/her vehicle through a central server. The central server may be accessed through the World Wide Web or through a hand held communication device or through an automated telephone system. The server is further connected to a mapping application with digitized maps. This application is used to translate the latitude and the longitude obtained from the GPS receiver to obtain the exact location on the map with respect to the town, the street, etc.

A major disadvantage of the above mentioned systems that utilize GPS and a communication device is that they require a central monitoring station or a web server. This makes the system expensive due to the cost involved in the set up of the monitoring station. Moreover, there is always a running cost involved with the operation of the monitoring station. Furthermore, the owner has to communicate with the monitoring station to obtain information regarding the vehicle. Also, because of the severe computational burden placed on the computer equipment at the vehicle monitoring station, tracking a large number of vehicles in real-time requires a substantial amount of processing power. Operators manage most of the monitoring stations; this adds to the cost of the system and makes it expensive. Therefore what is required is a system that does away with the monitoring center, thereby, reducing the overall cost of vehicle security and tracking.

SUMMARY

An object of the present invention is to overcome the drawbacks of the prior art by doing away with the need for a separate monitoring center.

Another object of the present invention is to provide a security and monitoring system that enables real-time two-way communication between a mobile asset and the owner thereof.

A further object of the present invention is to notify the asset owner of certain events. The event may include occurrences such as but not limited to the movement of the mobile asset, activation of alarm in case of crossing a predefined geographic area; in case the mobile asset is a vehicle; speeding of the vehicle or crossing of a predefined geographic area (henceforth called a "geofence") by the vehicle, activation of alarm of the vehicle etc.

Another object of the present invention is to provide, via a voice user interface, notifications to the mobile asset's owner on the medium of his/her choice such as but not limited to paging, phone calls, text messages, email etc.

Yet another object of the present invention is to process GPS information in form of latitude and longitude coordinates to obtain precise location information within the vehicle itself using a mapping system located in the vehicle.

A further object of the present invention is to provide the vehicle's owner with a set of features that he/she can remotely set or activate. These features comprise but are not limited to the motion, speeding or crossing of a predefined geographic area (i.e., the "geofence") by the vehicle.

Still another object of the present invention is to provide a security and monitoring system, which has a speech recognition and text to speech system built in.

A further object of the present invention is to provide a virtual mapping method wherein the user according to his/her preferences designs the maps stored in the asset. Additionally the user has the ability to modify, add or delete any of the locations specified in the defined map.

A further object of the present invention is to use the traffic channel of existing cellular infrastructure to eliminate the need for data aggregation.

Yet another object of the present invention is to enable the mobile asset's owner to remotely control features of the asset (such as locking and unlocking of doors of a vehicle, immobilizing the fuel supply and/or the ignition system of the vehicle, etc.) by keying instructions or by giving voice commands through his/her communication device.

Yet another object of the present invention is to enable the user to define a permissible geographic boundary or geofence having any shape and size.

The present invention is a mobile asset security system that comprises a GPS receiver, a plurality of intrusion detection devices, a control and intelligence unit and an embedded voice user interface that communicates information pertaining to the vehicle to the owner thereof through a communication network. The control and intelligence unit processes GPS and intrusion information to be transmitted to the owner as text or voice messages over his/her communication device. The GPS receiver helps determine the vehicle's precise location and this information is then transmitted as text or voice through a communication device connected to the control and intelligence unit in the vehicle. Similarly, the information pertaining to various vehicle features and intrusion detection devices indicating any tampering or intrusion may also be transmitted to the owner of the vehicle. The vehicle owner can control features such as fuel supply, door lock or unlock and ignition immobilize by entering instructions on his communication device or by giving voice commands to the control and intelligence unit through his/her communication device.

BRIEF DESCRIPTION OF THE DRAWINGS

The preferred embodiments of the invention will hereinafter be described in conjunction with the appended drawings provided to illustrate but not to limit the invention, wherein like designations denote like elements, and in which.

DETAILED DESCRIPTION

The present invention is a mobile asset security and monitoring system. The features of the invention are described in relation to a vehicle. It may be noted that the application of the current invention is not limited to vehicle alone, and may be used for security and monitoring of any mobile asset.

Figure 1:
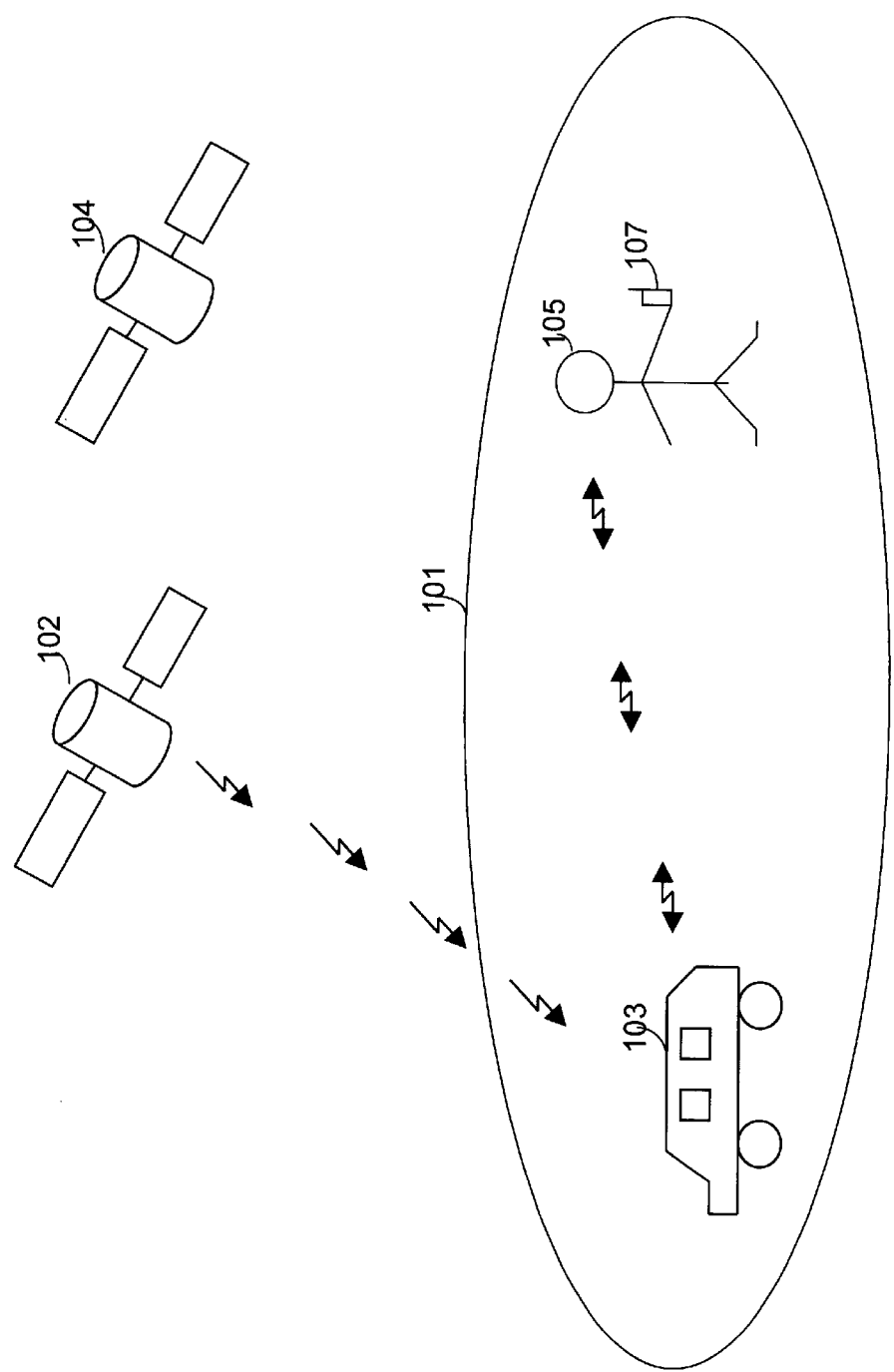
FIG. 1 is a perspective view of a landscape in which a vehicle equipped with a vehicle security system in accordance with the present invention is traveling.

FIG. 1 is a perspective view of the landscape in which a vehicle, equipped with the proposed security and monitoring system, is traveling. The vehicle 103 is located in and is traveling in the geographic area 101. The vehicle security system communicates with a user 105. In case of a security breach or a set of conditions being violated the vehicle security system sends a status message to user 105 notifying him/her of the security breach. The set of conditions include but are not limited to the motion, speeding or crossing of a predefined geographic area (geofence) by vehicle 103. The set of conditions can be defined and changed by user 105. The status message can contain information relating to the position of the vehicle. The status message can also contain information relating to any other type of security breach that might have occurred in the vehicle.

The status message can be sent as speech or as text messages to user 105 through any of the existing communication networks such as but not limited to GSM, AMPS, or D-AMPS and PSTN. The speech can be in a language desired by the user 105. The traffic channel of an existing cellular infrastructure can also be used, thereby eliminating the need for data aggregation that is required for control channel solutions currently on the market. The status message can also be sent to the users paging device, or to the users mobile device as a message using Short Message Service (SMS) protocol. The status message can also be sent as an email to the users email address. The user can choose the exact manner in which he/she desires to receive the message.

In order to obtain information regarding the position and speed of the vehicle, the vehicle is equipped with a position determining system. A preferred embodiment of the invention utilizes the Global Positioning System (GPS). The Global Positioning System (GPS) consists of a constellation of 24 earth-orbiting satellites. These satellites are used to determine the location of any object in terms of its latitude and longitude. Two of the orbiting satellites 102 and 104 are shown in FIG. 1. The satellites transmit position and time signals to a GPS receiver installed in vehicle 103. The GPS receiver then processes these signals to calculate its distance from a particular satellite by knowing the location of the satellite and calculating the time elapsed between the transmitted and received signal. This distance, when computed from a multitude of satellites simultaneously, determines precisely the location and velocity of vehicle 103.

Vehicle 103 is further equipped with a wireless communication device to enable real time communication between the vehicle and its user 105. User 105 communicates with the vehicle using a communication device 107. This communication device 107 can be a wireless device such as a cellular phone. The device can also be a normal wired telephone. Other modes and devices for communication such as emails can also be used. User 105 receives notification regarding vehicle 103 on his communication device 107.

User 105 can gain access to features of the vehicle security system by entering appropriate safeguards. The safeguard can be in the form of an authentication password. This is required to prevent unauthorized access to the vehicle security system. Communication device 107 can also be used to define and change the set of conditions that result in a notification to user 105. User 105 can also send commands to the security system through communication device 107 to activate features on vehicle 103. For example, the user can lock or unlock the doors of vehicle 103 by giving commands over his communication device 107. The user can give the commands either by pressing buttons on the communication device 107 or simply by speaking into it. In the former case, a DTMF detector built in the vehicle 103 is used to interpret the commands while a voice-recognition unit (also built in the vehicle 103) is used to interpret the spoken words.

Since the communication channel used is not limited to a particular geography, the notification can be sent to the owner even if he/she is physically not in the same city, state or even the country. The vehicle owner can control features such as fuel supply, door lock or unlock and ignition immobilize by entering instructions on his communication device or by giving voice commands to the vehicle's communication device through his/her communication device even from overseas location.

Figure 2:
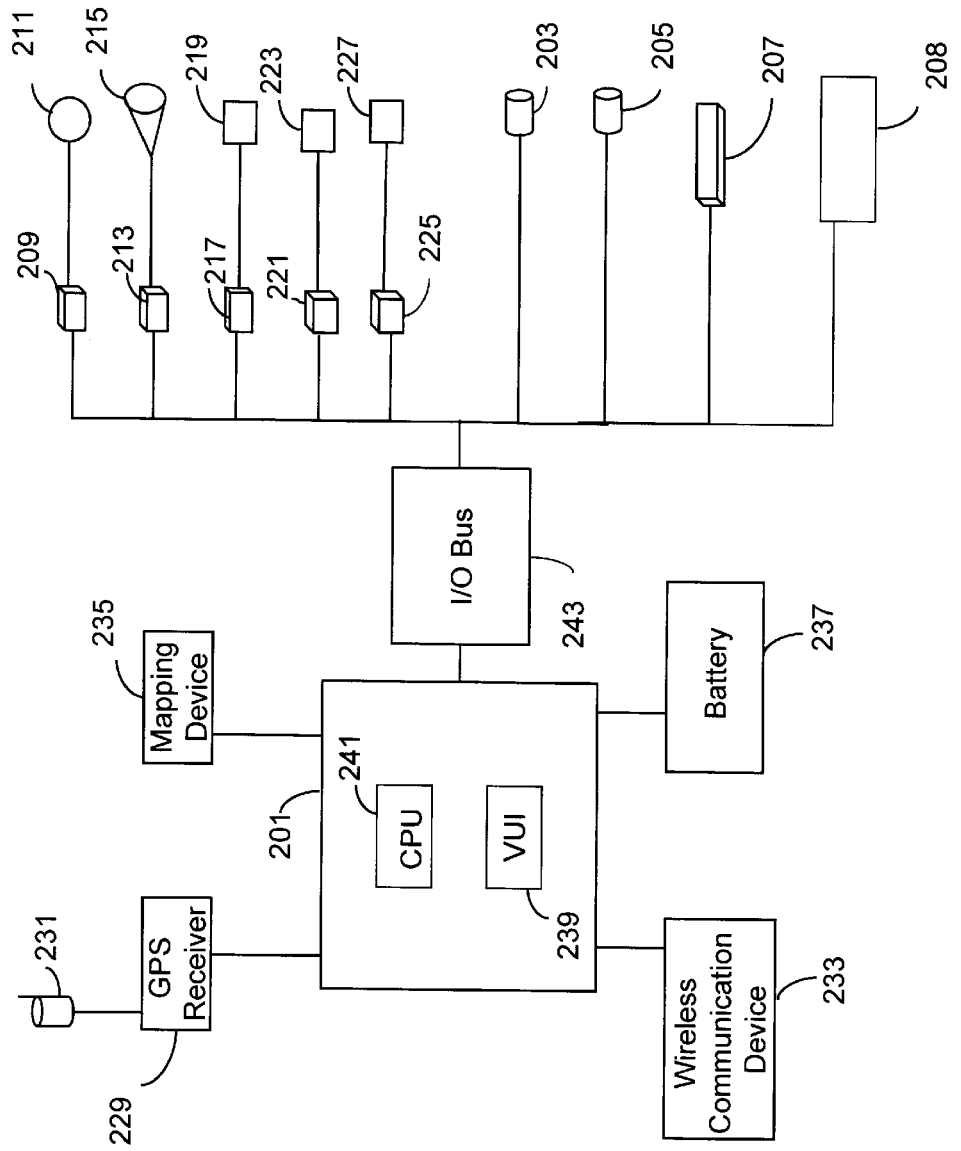
FIG. 2 is a schematic representation of the vehicle security system in accordance with the present invention.

FIG. 2 is a schematic representation of the security and monitoring system installed in a vehicle in accordance with the present invention. The system comprises a control and intelligence unit 201. Control and intelligence unit 201 is connected to a plurality of intrusion detection devices such as pin switches 203 and 205. A pin switch is an intrusion detection device that can detect the opening and closing of car doors, bonnet and hood. The intrusion detection devices may further comprise a motion detection sensor 207, used to detect the movement or towing away of the vehicle. It is apparent to one skilled in the art that various other kinds of intrusion detection or other signaling devices may be used. Control and intelligence unit 201 may further interface to a vehicle bus or to an existing vehicle alarm system through a bus interface unit 248. The existing vehicle alarm system may comprise of its own set of intrusion detection devices. User 105 can arm the intrusion detection devices remotely through communication device 107.

In case of any violation of the intrusion detection devices, a signal is sent to control and intelligence unit 201. Control and intelligence unit 201 on receiving a signal from any of the intrusion detection devices may flash the lights 211 or sound a siren 215. Lights 211 are flashed with a light relay 209 that is also connected to control and intelligence unit 201. Similarly, siren 215 is operated through a siren relay 213. Control and intelligence unit 201 may further immobilize the starter 219 and shut down the fuel line control valve 223. Fuel line control valve 223 controls the fuel supply between the fuel tank and the engine. Starter 219 of the vehicle is operated through a starter relay 217 and the opening and closing of fuel line control valve 223 is controlled through a fuel valve relay 221. Further, user 105 can define a geofence radius. The geofence represents a user-defined area in which vehicle 103 can travel without triggering an alarm. The crossing of the specified geofence by vehicle 103 represents violation of a predefined condition, which in turn triggers an alarm.

The geofence may have any shape. The shape can be circular, square, rectangular etc. Also, the geofence can be of any size. For example, a geofence can be defined so that it bounds the area within which the points of interest (such as school, house, library and some friend's house) are located. The user can define several such geofences for the vehicle, with each geofence corresponding to a permitted location where the vehicle is allowed to travel.

On violation of a predefined condition or in the event of the vehicle not operating in the permitted locations, a message in the form of synthesized speech or text is transmitted to user 105 on communication device 107. This message comprises information about the position, speed and course over ground of the vehicle. The information about the position, speed and course over ground is obtained from a GPS receiver 229 that is connected to a GPS antenna 231 for receiving signals from GPS satellites. The preferred embodiment of GPS receiver 229 is a stand-alone module. Other designs can be substituted in place of a stand-alone device.

When control and intelligence unit 201 needs GPS information, it turns on the GPS receiver 229. The GPS information is sent to a central processing unit 241, which is a part of control and intelligence unit 201. Location information, in the form of GPS coordinates i.e. latitude and longitude, is processed by central processing unit 241 to output a status signal. Central processing unit 241 uses a mapping device 235 to extract the name of the place, street etc. Mapping device 235 may comprise a compact disc containing the map of the desired region. The compact disc can also contain maps of large geographic areas. With advances in technology it has become possible to store an entire map of the United States in a single CDROM. It is apparent to one skilled in the art that the mapping data can also be compressed and stored in other storage devices such as the read only memory (ROM) of the system. Central processing unit 241 links the GPS coordinates to the nearest town or city in mapping device 235. The name of the nearest city or town in text format is obtained in this manner. This information obtained from the mapping device is processed and transmitted to user 105 as messages comprising text or synthesized speech. In order to transmit the information control and intelligence unit 201 is further connected to wireless communication device 233.

In an alternate embodiment, a virtual mapping method can be employed. The user can design his/her specific maps and these can be stored in the asset. The defined map corresponds to only the permitted locations including user specified "Points Of Interest" (POI). These points of interests can be identified by names (such as school, library, bank, grocery shopping, friend's house, etc.). This virtual mapping method can dramatically reduce the memory required to store the map and also give the asset owner an easier way to know the location of the asset without having to determine the location by entering latitude and longitude data into another map data system. Additionally, the user can have the ability to modify, add or delete any of the POI.

In order to convert information to synthesized speech, control and intelligence unit 201 comprises a voice user interface 239 connected to central processing unit 241. CPU 241 sends the status signal to voice user interface 239 for conversion to a status message in the form of speech. Voice user interface 239 further comprises a text to speech (TTS) system 307 (explained in detail in conjunction with FIG. 3). The status signal is converted to speech by the text to speech system of voice user interface 239. The status signal comprises geographic information of the vehicle in the form of place, street etc. The status signal further comprises information regarding the violation of a predefined set of conditions. The text to speech system converts the speech to a language desired by the user. Alternatively, the status signal can be directly transmitted as simple text using standard modem technology and protocols or through DTMF tones.

The vehicle security system can also receive control commands from user 105 through wireless communication device 233. These commands may comprise either voice commands or keyed commands as DTMF signals. The voice commands and DTMF signals are interpreted in the voice recognition and DTMF decoder unit of voice user interface 239. A typical command may be to lock or unlock the door. When the user sends such a command to the vehicle, the command is directed to voice user interface 239 where the command is recognized by the voice recognition and DTMF decoder unit. Digitized signals from the voice recognition and DTMF decoder unit are then sent to central processing unit 241. Central processing unit 241 sends the appropriate control signals to the lock/unlock relay and the locking/unlocking function is performed. Also, the control signals may direct control and intelligence unit 201 to send the status message to the user.

In order to send and receive signals, control and intelligence unit 201 is connected to an input/output (I/O) bus 243 that carries input and output signals for control and intelligence unit 201. The input signals comprise information from various intrusion detection devices to control and intelligence unit 201. Furthermore, the input signals may also comprise information about various vehicle parameters e.g. fuel level from bus interface unit 208 to control and intelligence unit 201. Control and intelligence unit 201 also outputs signals to a plurality of output devices. This is achieved by placing the output signals on the input/output bus 243. The output signals may consist of signals to operate the plurality of output devices connected to the control and intelligence unit 201. This includes devices like siren relay 213, light relay 209 etc.

Control and intelligence unit 201 operates on power derived from the vehicle battery 237. In addition, the security system may be further equipped with a backup battery hidden in the vehicle. This backup battery is useful in cases when the thief tries to disable the security system by disconnecting vehicle battery 237.

Figure 3:
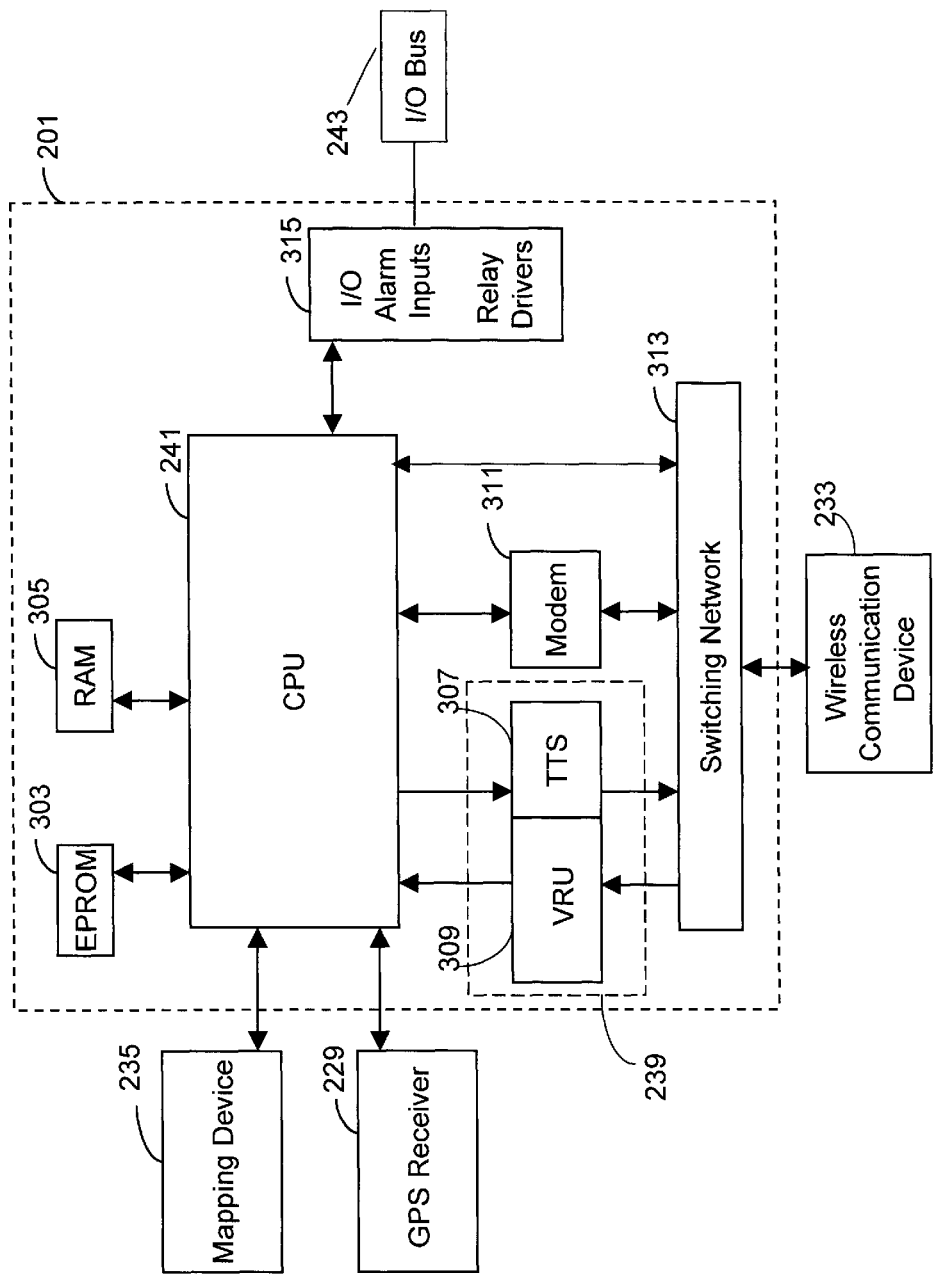
FIG. 3 is a block diagram of internal components of a control and intelligence unit.

FIG. 3 is a block diagram of the internal components of control and intelligence unit 201. CPU 241 is connected to an Erasable Programmable Read Only Memory (EPROM) 303 and a Random Access Memory (RAM) 305. CPU 241 is also connected to a text to speech system 307 and a voice recognition and DTMF decoder unit (VRU) 309. Text to speech system 307 and VRU 309 are part of voice user interface 239. CPU 241 is further connected to a modem 311. Text to speech system 307, VRU 309 and a modem 311 are connected via a switching network 313 to wireless communication device 233. CPU 241 controls switching network 313 in order to activate only one of the three communication lines between the wireless communication device 233 and CPU 241. The three communication lines comprise communication through text to speech system 307, VRU 309 and modem 311.

CPU 241 is further connected to an input/output module 315. Input/output module 315 is connected to an input/output bus 245. Input/output bus 243 carries signals from various intrusion detection devices to input/output module 315. These intrusion detection devices include pin switches 203, 205 and motion detection sensor 207. Further, input/output bus 245 carries information about various vehicle parameters e.g. fuel level from bus interface unit 208 to input/output module 315. Input/output bus 243 also carries output signals from input/output module 315 to various control relays. These control relays may include light relay 209, siren relay 213, starter relay 217, fuel valve relay 221 and door lock/unlock relay 225. The control of various relays is accomplished with the help of relay drivers that are also part of input/output module 315. This is because automotive relays generally operate at voltages higher than those of central processing unit 201. Hence, relay drivers are used to step up voltages.

CPU 241 is further connected to GPS receiver 229 and mapping device 235. Also, it is apparent to one skilled in the art that communication device 233 and GPS receiver 229 can be integrated into a single device. CPU 241 receives position data in the form of latitude and longitude from GPS receiver 229. The function of mapping device 235 is to translate the latitude and longitude obtained from the GPS receiver to the location information of the vehicle. The location information contains, but is not limited to the name of the nearest city, names of major cross streets, the speed and direction of traveling. The location information also contains an estimated distance from the user's home or from a given reference location.

The location information obtained by the use of mapping device 235 is transmitted as a status message to user 105. The status message may also comprise information pertaining to violation of an intrusion detection device or violation of a predefined set of conditions. The message may further comprise of information about various vehicle parameters such as fuel level etc. These messages may be transmitted to user 105 as speech by converting them to analog speech signals through voice user interface 239. These analog speech signals are further transmitted to user 105. Switching network 313 achieves this by activating the communication line between text to speech system 307 and wireless communication device 233. The speech transmitted to the user is in a user-friendly format. For example, to give a speeding notification, a typical voice message would be "car speeding at 80 miles per hour 5 miles North East from home in the city of Fremont". Alternatively, when the user has defined points of interest, the status message can be with respect to the POI closest to the vehicle. If the system were to supply information regarding the location of the vehicle, a typical message would be "car at the crossing of Howard and mission in Fremont, 8 miles southwest from home". These transmissions can also be in different languages. The text to speech system is designed to handle multiple languages. Presently English, Japanese, German, French, Spanish and Chinese are supported. It is apparent to one skilled in the art that other languages can also be supported.

The transmission can also be in the form of text messages. If the user requires text information it can be transmitted to the user through modem 311. Switching network 313 achieves this by activating the communication line between modem 311 and wireless communication device 233. Modem 311 is also used for continuous tracking of the vehicle and getting a log of its movement. For continuous tracking, the raw GPS data is transmitted to a monitoring agency or a law enforcement agency, which is authorized to receive the data. The raw location data obtained from the GPS is interfaced with mapping software. In this manner movement of vehicle 103 is traced on a map.

User 105 can also send control commands to security system through communication device 107. These controls commands may comprise of keyed commands in the form of DTMF signals or voice commands. These commands are received by communication device 233 and directed by the switching network 233 to VRU 309. VRU 309 interprets the command and sends the corresponding digital signals to CPU 241 for execution of the command.

The vehicle security system may also receive control commands from user 105 in the form of text messages. These commands are received by communication device 233 and directed by switching network 233 to modem 311. Modem 311 then converts these commands to appropriate digital signals and directs it to CPU 241 for execution of the command.

Figure 4:
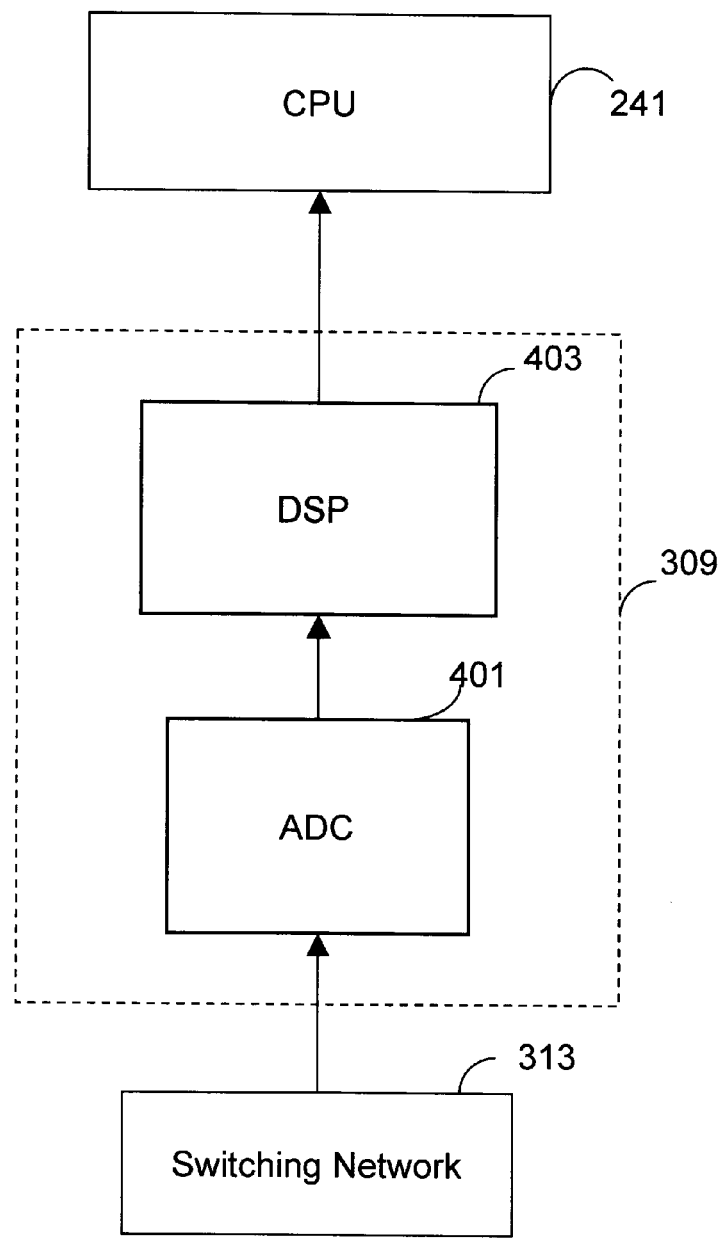
FIG. 4 is a block diagram of internal components of a voice recognition and Dual Tone Multi-Frequency (DTMF) decoder unit.

FIG. 4 is a block diagram of the internal components of VRU 309. VRU 309 receives the voice commands from communication device 233 through switching network 313. These voice commands are converted to digital signals using an analog to digital converter 401. The digital signals are further fed into a digital signal processor 403. Digital signal processor 403 validates the spoken command against a stored command. Stored commands are a set of stored voice messages particular to a user for controlling various features of the vehicle security system. On proper validation an appropriate digital signals is sent to CPU 241 to execute the given command. User 105 may alternatively enter keyed commands on his communication device 107 in the form of DTMF signals. These are also executed in a similar manner.

Figure 5:
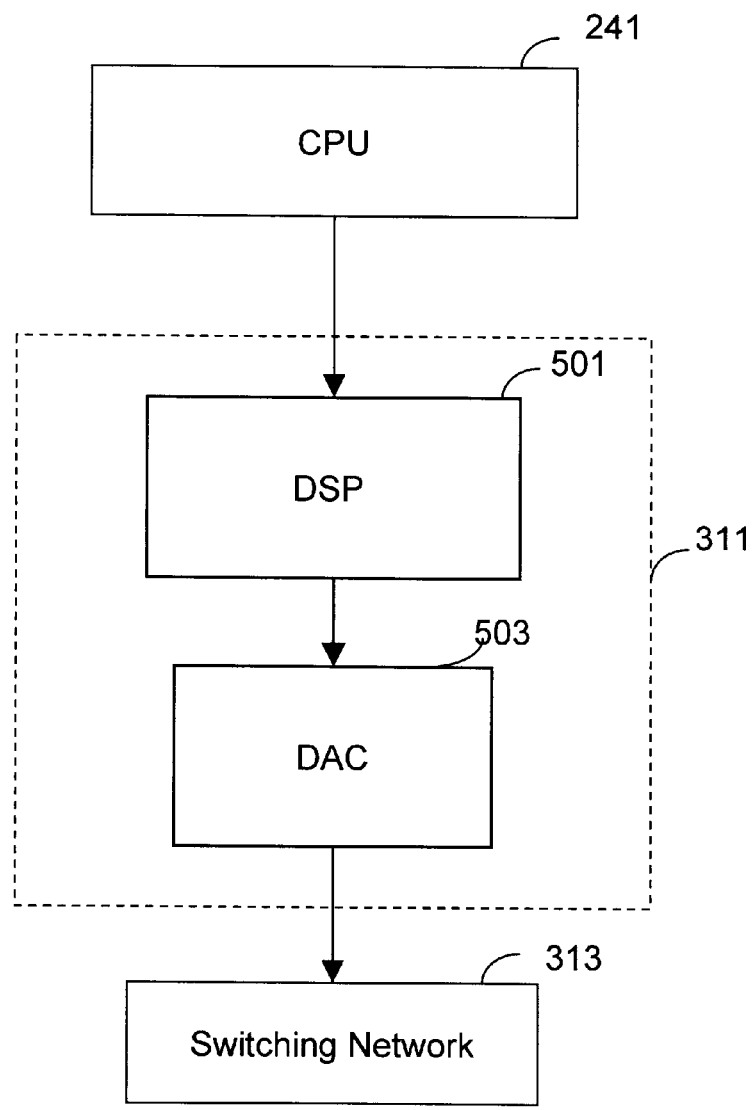
FIG. 5 is a block diagram of internal components of a text to speech system.

FIG. 5 is a block diagram of the internal components of text to speech system 307. Text to speech system 307 can synthesize speech in any preferred language and provide mapping, speed, direction and other diagnostic information in a language desired by user 105. A digital signal processor 501 receives digitized text messages from CPU 241. Digital signal processor 501 converts digitized text messages to digitized speech in a language desired by the user. These digitized speech signals are further fed into a digital to analog converter 503. Digital to analog converter 503 converts these digitized speech signals into analog speech signals. These analog speech signals are further directed by switching network 313 to wireless communication device 233 for transmission to user 105.

In an alternative embodiment, the GPS receiver, the intrusion detection devices and control and intelligence unit are integrated.

In yet another alternative embodiment, the security and monitoring system may not have the intrusion detection devices. In such a case the system can be used for vehicle tracking and detecting the violation of a predefined condition. The predefined condition in this case comprises conditions like the vehicle not crossing the geofence, the vehicle not speeding over a specified speed limit etc.

The security and monitoring system is not limited in application to vehicles as described above. This system may be used for protection and tracking of any movable or mobile asset including but not limited to shipping containers, heavy equipment and the like as well as living beings such as babies and pets.

While the preferred embodiments of the invention have been illustrated and described, it is clear that the invention is not limited to these embodiments only. Numerous modifications, changes, variations, substitutions and equivalents will be apparent to those skilled in the art without departing from the spirit and scope of the invention as described in the claims.

What is claimed is:

1. A security and monitoring system for mobile assets, the system communicating directly with a user, the system comprising:

a. a position determining device for determining location data of the mobile asset;
b. means for providing geographic information based on the location data of the mobile asset;
c. a device for detecting the violation of a predefined condition, the detecting device generating a signal on violation of the predefined condition;
d. a virtual mapping module enabling the user to define permitted locations wherein the permitted locations are specific locations of interest specified by the user;
e. a central processing unit for processing the location data and the geographic information to obtain location information of the mobile asset, the central processing unit having a memory storing permitted locations and a predefined set of conditions, the central processing unit detecting violation of permitted locations by using the location information of the mobile asset, the central processing unit detecting violation of the predefined set of conditions using the signal from the detection devices, the central processing unit generating a status signal on violation of at least one of the permitted locations and the predefined conditions;
f. means for synthesizing the status signal generated by the central processing unit to output a status message;
g. a data transceiver for facilitating communication in data mode, the data transceiver enabling transmission of the status signal as data and receiving of control commands from the user as data;
h. a wireless communication device for two-way communication between the user and the mobile asset, the wireless communication device transmitting the status message to the user as voice or text message, the wireless communication device receiving control commands from the user as voice or text message;
i. means for interpreting the control commands, the interpreted commands processed by the central processing unit to generate output signals; and
j. a plurality of output devices, the output device responsive to output signals from the central processing unit, whereby the output devices execute the control commands processed by the central processing unit.

2. The system as recited in claim 1 wherein the position determining device is a GPS receiver.

3. The system as recited in claim 1 wherein the position determining device and the communication device are integrated.

4. The system as recited in claim 1 wherein means for synthesizing a status message comprises a text to speech synthesizer for outputting status messages as speech.

5. The system as recited in claim 1 wherein means for synthesizing a status message comprises a modem for outputting status messages as text.

6. The system as recited in claim 1 wherein the means for interpreting control commands comprises a voice recognition unit for interpreting voice.

7. The system as recited in claim 1 wherein means for interpreting control commands comprises a DTMF decoder unit for interpreting DTMF tones.

8. The system as recited in claim 1 wherein means for interpreting control commands comprises a modem for interpreting text.

9. The system as recited in claim 1 wherein the output devices comprise a plurality of alarm relays and security relays.

10. An apparatus for security and monitoring of mobile assets, the apparatus enabling direct contact between a user and the mobile asset, the apparatus comprising:

a. a position determining device for obtaining location data of the mobile asset;

b. a device for detecting the violation of a predefined condition, the detecting device generating a signal on violation of the predefined condition;

c. a memory containing data regarding geographic information, permitted locations, predefined set of conditions and computer readable program codes, the computer readable program codes further comprising;

i. program code means for determining location of the mobile asset;

ii. program code means for enabling the user to define permitted locations, the permitted locations are specific locations of interest specified by the user;

iii. program code means for generating a status signal on violation of at least one of the permitted locations and the predefined set of conditions;

iv. program code means for synthesizing the status signal to output a status message;

v. program code means for transmitting the status message to the user;

vi. program code means for receiving control commands from the user;

vii. program code means for interpreting the control commands received from the user;

viii. program code means for generating an output signal in response to the interpreted control commands;

d. a processor connected to the memory, the processor executing the computer readable program codes stored in the memory;

e. a data transceiver fort facilitating communication in data mode, the data transceiver enabling transmission of the status signal as data and receiving of control commands from the user as data;

f. a plurality of output devices, the output devices responsive to the output signal generated, whereby the output devices execute the control commands; and g. a wireless communication device connected to the processor, the wireless communication device communicating the status message to the user and transmitting the user control commands to the processor for processing.

11. The apparatus as recited in claim 10 wherein the device for detecting the violation of a predefined condition comprises an intrusion detection device.

\* \* \* \* \*